A. WARTH.

Machines for Cutting Lead-Pencils.

No. 5,228. Reissued Jan. 7, 1873.

Witnesses:

C. Wahlers

Ernst Bilhuber.

Inventor.

Albin Warth per

Van Santvoord & Hauff

Attys.

3 Sheets--Sheet 2.

A. WARTH.

Machines for Cutting Lead-Pencils.

No. 5,228. Reissued Jan. 7, 1873.

*Witnesses:*

C. Wahlen.
Ernst Bilhuber.

*Inventor:*

Albin Warth
per
Van Santvoord & Hoyt
Attys

A. WARTH.

Machines for Cutting Lead-Pencils.

No. 5,228. Reissued Jan. 7, 1873.

Witnesses:
Ernst Bilhuber.
C. Wahlers.

Inventor:
Albin Warth
per Victor J. Evans & Co. Atty

UNITED STATES PATENT OFFICE.

ALBIN WARTH, OF STAPLETON, NEW YORK, ASSIGNOR TO EBERHARD FABER.

IMPROVEMENT IN MACHINES FOR CUTTING LEAD-PENCILS.

Specification forming part of Letters Patent No. 43,267, dated June 21, 1864; reissue No. 5,228, dated January 7, 1873.

*To all whom it may concern:*

Be it known that I, ALBIN WARTH, of Stapleton, in the county of Richmond and State of New York, have invented a new and useful Improvement in Machines for Cutting Lead-Pencils; and I do hereby declare the following to be a full, clear, and exact description thereof, which will enable those skilled in the art to make and use the same, reference being had to the accompanying drawing forming part of this specification, in which drawing—

Figure 1:
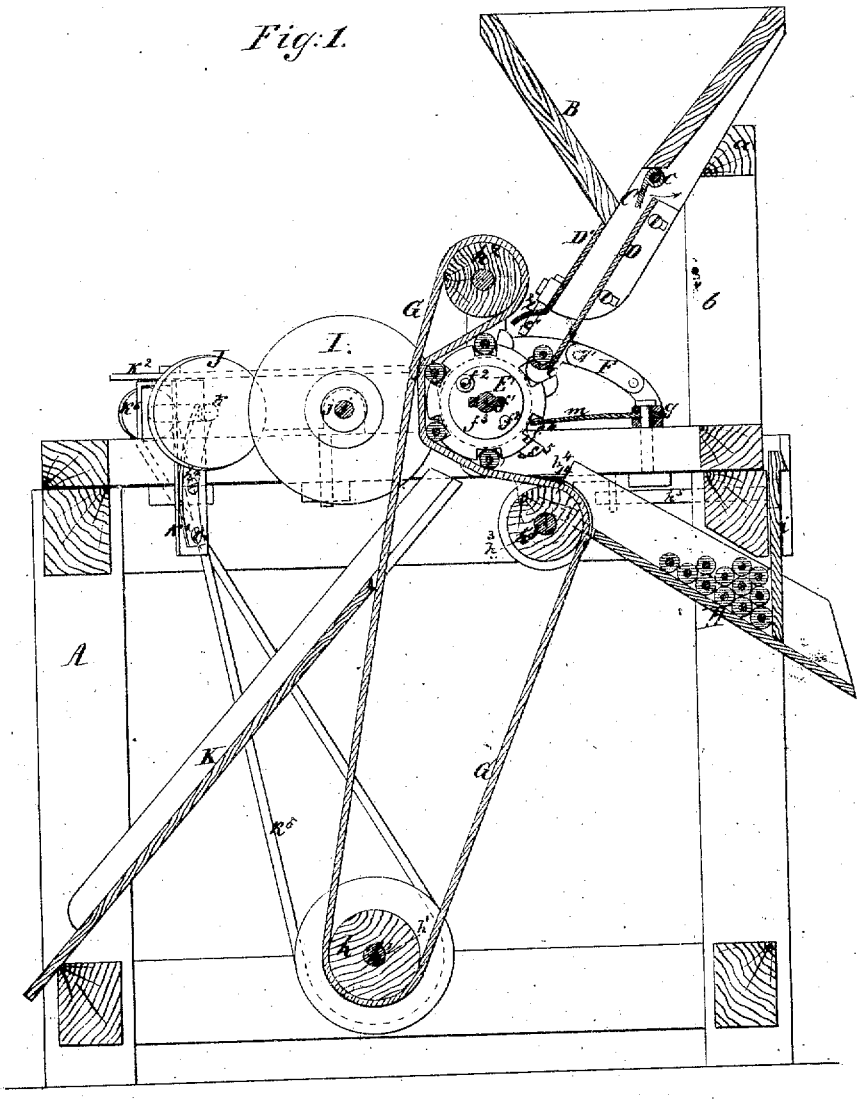
Figure 2:
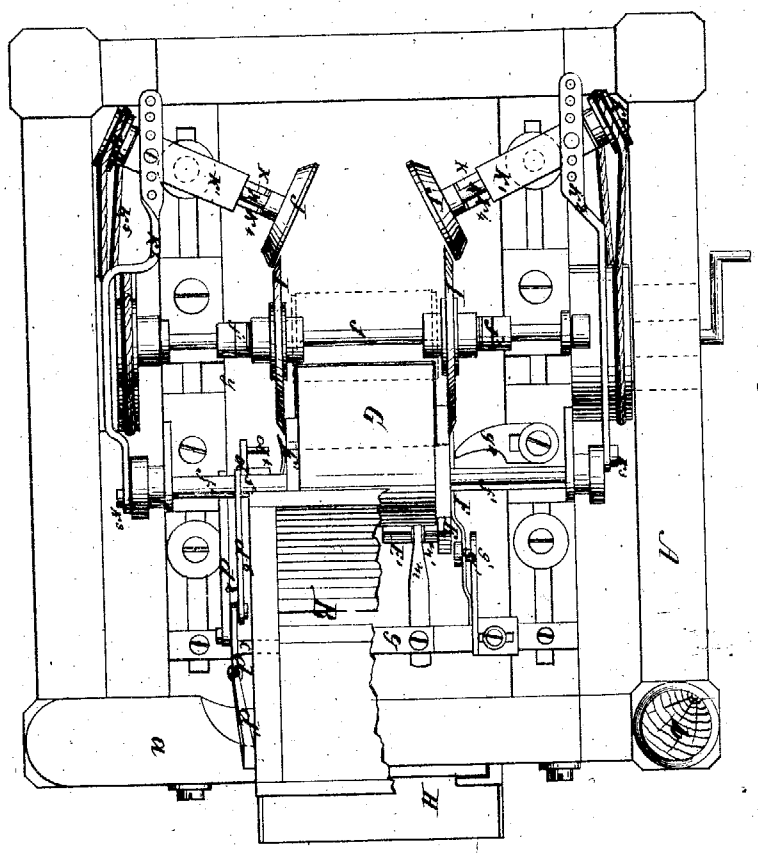
Figure 3:
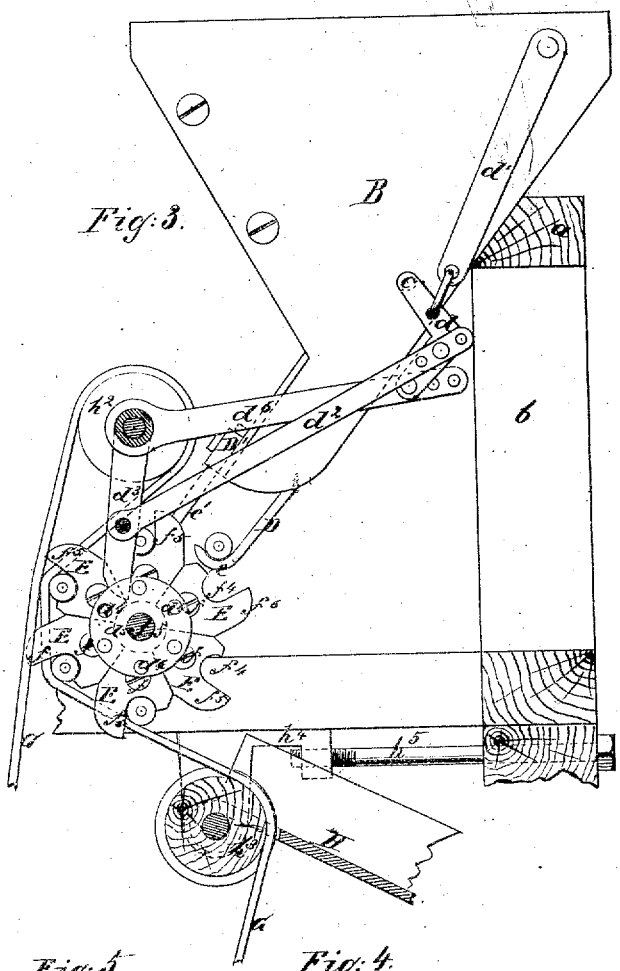
Figure 5:
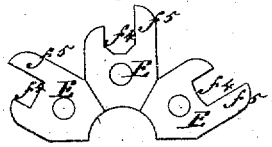
Figure 4:
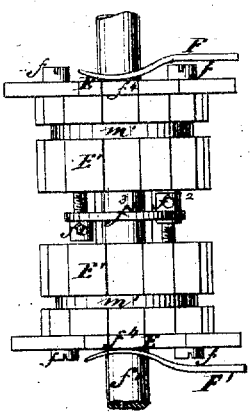
Figure 6:
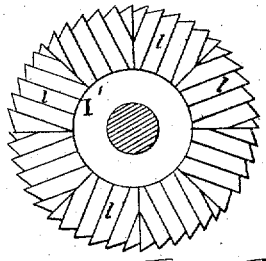

Figure 1 represents a longitudinal vertical section of my invention in the plane *x x*, Fig. 2. Fig. 2 is a plan or top view of the same. Fig. 3 is a partial section of the same in the plane *y y*, Fig. 2. Fig. 4 is a detached plan of the carrying-roller. Fig. 5 is a detached side elevation of some of the carriers. Fig. 6 is a detached face view of the saw.

Similar letters of reference indicate like parts.

This invention relates to machinery for cutting and smoothing the ends of pencils, which embraces a feed-hopper for the pencils, feeding devices for carrying the pencils to the knife, and a knife or blade for cutting and smoothing the ends of the pencils, which, by the operation of the feed devices, are presented regularly and in succession to the knife. My invention consists in a device which agitates the pencils in the hopper and prevents them from crowding into the throat thereof to such an extent as to interfere with the free delivery of the pencils to the feeding devices or pencil-carriers; also, in the arrangement of a pencil-carrier which can be readily adjusted to carry pencils of different sizes, and which receives the pencils from the hopper in regular succession, said hopper being provided with supporting-hooks from which the pencils are scraped out by scrapers attached to the carrier. Elastic wipers also are provided, which prevent more than one pencil at a time from lodging in the successive sockets of the carrier. With the pencil-carrier or feeding device are combined one or more cutters, which are kept sharp by suitable sharpening devices.

In the drawing, the letter A designates a frame, made of wood or any other suitable material, of sufficient strength and durability to support the working parts of this machine. B is a hopper-box through which the lead-pencils are fed to the cutting mechanism, and which is secured to a cross-bar, *a*, that rests upon two standards, *b*, rising from one end of the frame A. Close under the bottom edge of one of the inclined sides of said hopper extends a shaft, *c*, on which is secured the agitator C. The required motion is imparted to this agitator by means of an arm, *d*, which is mounted on the shaft *c* and connected to a spring, $d^1$, (see Fig. 3,) that has a tendency to turn the shaft *c* and to throw the agitator C back in the direction of the arrow marked near it in Fig. 1; and said arm also connects by a strap, $d^2$ with a tappet, $d^3$, which is actuated by a series of pins, $d^4$, (see Fig. 3,) projecting from the inner surface of a rotating disk, $d^5$. By these means a vibrating motion is imparted to the agitator C, and thereby the pencils in the hopper-box are kept in motion and prevented from crowding into or from choking the throat or discharge-opening of said hopper. A strap, $d^6$, extending from the arm *d* to some fixed portion of the machine, serves to take up the rebound of the agitator and to ease its motion. On passing from the hopper the pencils roll down in succession between the inclined guide-plates D D′ which are fastened below the discharge-opening of said hopper (see Fig 1) at such a distance apart that room is left between them for one pencil. The plates D′ are rigidly secured in their position, and they are provided with fingers $e^2$ intended to assist in bringing the pencils down into the sockets of the carriers, but the plates D are adjustable toward and from the plates D′, so that they can be set for pencils of different thickness, and their lower ends form hooks *e*, which retain the lowest pencil in the row contained between the plates D D′. (See Figs. 1 and 3.) Wipers $e^1$, of India rubber or other flexible and elastic material, which are attached to the plates D′, serve to keep the pencils down in the sockets and to prevent more than one pencil at a time lodging in either of said sockets. E are the carriers, which are secured to the ends of the carrying-heads E′ by means of screws *f*. (See Figs. 3 and 4.) The heads E′ are mounted on the shaft $f^1$, and they are so arranged that they can be adjusted further apart or closer together, to suit pencils of different length. In order to effect this purpose said heads are mounted on the shaft $f^1$ so that they can move on it in the direction of its axis, and they connect, by set-screws $f^2$, with a disk, $f^3$, which is firmly keyed or otherwise fastened on the shaft $f^1$, so that by turning the set-screws the heads E′ can be moved from or toward each other, as may be desired. It is obvious, however, that the object of adjusting the heads on the shaft $f^1$ can be accomplished in many different ways—such, for instance, as a screw-thread and nuts on the shaft $f^1$ itself, or set-screws passing through the heads themselves; but it is of great importance to adjust the heads exactly at the proper distance apart, for if a pencil projects too much when acted on by the knife, it is liable to split, and the heads ought to be adjusted so that the ends of the pencils do not project beyond the carriers more than the thickness of a sheet of paper, or just enable the cutter to take off a thin slice and impart to the ends of the pencil the desired finish. The carriers E are furnished with sockets $f^4$ to receive the pencils, said sockets being made to receive either round, hexagonal, or octagonal pencils, (see Fig. 5,) and different sets of carriers are provided to receive pencils of different thickness. From one side of each of these sockets projects a scraper, $f^5$, which is intended to scrape out the pencil supported by the hooks $e$ of the guide-plates D at the moment it passes the same, and to cause said pencil to drop into the socket. Each pencil, on being thrown out of the hooks $e$, strikes the fingers $e^2$ and [illegible] wipers $e^1$, whereby it is compelled to drop down into the sockets, while said wipers also prevent two pencils from lodging simultaneously in the same socket. After the pencils have been deposited in the socket $f^4$ they are moved successively between two gages, F F′, which extend from the rear cross-bar $g$ of the frame A. These gages are made in the form of springs, and they bear against the ends of the pencils passing between them, the power with which they press against the pencils being regulated by means of set-screws $g^1$. (See Fig. 2.) By the action of these gages the pencils are brought into the required position in relation to the carriers, the ends of each pencil being made to protrude the proper distance beyond the carriers, and in order to make allowance for any small variation existing in the length of the different pencils, one of the gages F′ is allowed to yield without limit, while the other gage F can only recede until it strikes a bracket, $g^2$, which is so adjusted that the end of the pencil on that side will extend beyond the carrier the exact distance required, while the opposite end of the pencil may extend beyond the carrier a little more or a little less, according to its length.

By adjusting the bracket $g^2$ the quantity to be cut off on each end of the pencil can be evenly divided, and, by the action of the gages bearing against the ends of the pencils, said pencils are held firmly in position while the cutters act. The shaft $f^1$, on which are mounted the heads E′ and carriers E, receives its motion by means of a belt, G, which extends from a pulley, $h$, on the driving-shaft $h^1$, over a pulley, $h^2$, on an arbor, extending across the frame A in front of the hopper-box and over the carrying-heads, and from this pulley said belt extends round the carrying-heads E′ and over a pulley, $h^3$, back to the pulley $h$. (See Fig. 1.) The pulleys $h^2$ and $h^3$ are so situated, in relation to the carrying-heads E′, that the belt G embraces a considerable portion of said heads and imparts to them the desired motion, while at the same time said belt presses the pencils down into the sockets of the carriers and retains them while their ends are cut off, and, after the cutting operation has been accomplished, the pencils drop on the belt G and are carried into the chute H, from which they drop into a suitable box or receptacle. A slide, $i$, serves to shut off the discharge from the chute while the receiving-box is changed. The arbor of the roller $h^3$ has its bearings in boxes $h^4$, to which a sliding motion can be imparted by screws $h^5$, Figs. 1 and 3, so that the tension of the belt G can be regulated.

The operation of cutting the pencils is effected either by the smooth-edged cutters I, or by the circular saws I′, illustrated in Fig. 6. Said cutters are mounted on an arbor, $j$, which has its bearings in suitable brackets secured to the frame A. The cutting-edges of these cutters are held in close contact with the outer surfaces of the carriers E by means of springs $j'$, of India rubber or other suitable material, and the carriers are made of steel and hardened, the outer edges of the sockets $f^4$ in said carriers being left sharp, so that the operation of cutting is effected between the cutting-edges of the cutters and the sharp edges of the sockets of the carriers. The cutters I are by preference made concave, so that the wood or cuttings from the pencils have room to discharge, and that the ends of the wood are prevented from getting soiled by the cuttings of the lead.

The cutting-edges of the cutters, which are liable to become dull by the lead of the pencils, are continually sharpened by the action of grinding-stones or emery-wheels J, which are mounted on the ends of arbors $k$ that have their bearings in frames $k^1$, to which an oscillating motion is imparted by rods $k^2$, extending from eccentric wrist-pins $k^3$, which project from disks secured to the ends of the shaft $f^1$ of the carrying-heads. By the oscillating motion of the frames $k^1$ the faces of the stones are continually drawn across the beveled faces of the cutters, and by this motion the operation of sharpening the cutting-edges is facilitated, and at the same time the faces of the grinding-stones or emery-wheels are kept level and prevented from wearing uneven. The burrs raised at the cutting-edges on the inner sides of the cutters are stripped off by contact with the hardened faces of the carriers E. The arbors $k$ are so arranged in the oscillating frames $k^1$ that they can assume a sliding motion in the direction of their length, and springs $k^4$, acting on the backs of the stones or wheels J, keep the grinding-surfaces continually up to their work. A rotary motion is imparted to the grinding-wheels by means of belts $k^5$, extending from suitable pulleys on the driving-shaft over pulleys $k^6$ on the ends of the arbors $k$. These grinding-wheels may also be used if instead of the cutters I the saws I′ are employed. These saws are composed of a series of steel sectors $l$, which are secured to a back of brass or other suitable material, and the faces of which are provided with radial teeth, as shown in Fig. 6. By the action of the grinding-wheels on the outer surfaces of these saws the points of the saw-teeth are continually kept sharp and the saws are enabled to cut without splintering the work. The cuttings taken off from the ends of the pencils by the action of the saws or cutters drop down upon an inclined chute, K, and are deposited in front of the machine. The pencils, after having been cut, are discharged from the carriers and carrying-heads by the action of clearers $m$, which are secured to the cross-bar $g$ and project into grooves $m'$ turned in the surface of the carrying-heads to such a depth that the points of said clearers are enabled to catch under the pencils contained in the sockets of the carriers. On being discharged from the carriers the pencils, by the action of the belt G, are deposited in the chute H, as previously stated.

By this machine the operation of cutting off the ends of lead-pencils can be effected with very little hand labor, in a superior manner, and without much loss of time.

What I claim as new, and desire to secure by Letters Patent, is—

1. A machine constructed, arranged, and operating substantially as herein described, for cutting off the ends of lead-pencils.

2. The arrangement of an agitator acting on the pencils contained in the hopper-box of the cutting-machine, substantially as described.

3. In combination with the pencil-containing hopper-box, a pencil-carrier, E, provided with sockets $f^4$ to receive the pencils from the hopper and to expose them in succession to the action of the cutter I, substantially as set forth.

4. The elastic fingers or wipers at the bottom of the hopper-box, in combination with the moving carriers, substantially as and for the purpose described.

5. In combination with the pencil-supporting hooks at the discharge of the hopper-box, the arrangement of scrapers projecting from the moving carriers and serving to throw the pencils out of said hooks into the sockets of the carriers, substantially as set forth.

6. The combination of adjustable heads E with the moving pencil-carriers, so that said carriers can be adjusted for pencils of different length.

7. The combination of a revolving cutter, I, with a moving pencil-carrier, E, the cutting-edge of the cutter being made to co-operate with the outer edge of the pencil-receiving sockets in the carrier, substantially in the manner described.

8. The combination of the bracket $g^2$ with the gages F F′, the pencil-carrier E, and with a revolving cutter, I, substantially as specified.

9. The arrangement of a belt extending partially round the pencil-carriers and serving to hold the pencils down during the operation of cutting and to carry them away from the carriers after they have been cut, substantially as described.

10. The arrangement of clearers extending beneath the pencils contained in the moving carrier and serving to disengage said pencils from the carrier at the proper time, substantially as set forth.

11. The combination of an oscillating and yielding sharpening-wheel, J, with the revolving cutter I, substantially as described.

ALBIN WARTH.

Witnesses:
W. HAUFF,
E. F. KASTENHUBER.